H. L. HOUGH.
TURPENTINE CONDENSER.
APPLICATION FILED NOV. 27, 1912.

1,092,052.

Patented Mar. 31, 1914.
6 SHEETS—SHEET 1.

H. L. HOUGH.
TURPENTINE CONDENSER.
APPLICATION FILED NOV. 27, 1912.

1,092,052.

Patented Mar. 31, 1914.
5 SHEETS—SHEET 5.

Witnesses:
C. P. Kesler
Chas. S. Hyer

Inventor
Henry L. Hough
by
James L. Norris
Atty.

UNITED STATES PATENT OFFICE.

HENRY L. HOUGH, OF REDLEVEL, FLORIDA.

TURPENTINE-CONDENSER.

1,092,052.  Specification of Letters Patent.  Patented Mar. 31, 1914.

Application filed November 27, 1912. Serial No. 733,909.

*To all whom it may concern:*

Be it known that I, HENRY L. HOUGH, a citizen of the United States, residing at Redlevel, in the county of Citrus and State of Florida, have invented new and useful Improvements in Turpentine-Condensers, of which the following is a specification.

This invention relates to condensers for use with turpentine stills or other apparatus for treating turpentine to separate the rosin therefrom and to render the turpentine in as pure a state as possible, the improved condenser being used additionally or as an auxiliary to the usual form of worm or condenser; and the object of the improved apparatus is to subject the uncondensed vapors passing through the ordinary condensing coil or worm of a turpentine still without condensation to a further positive condensation treatment so that all the products of distillation as well as the finer grades of turpentine may be wholly recovered and the water separated therefrom, with material advantages in the production of a refined turpentine and a general economy in the operation of distilling apparatus of this character.

The invention consists in the preferred forms of the apparatus which will be more fully hereinafter described and claimed.

Figure 1:
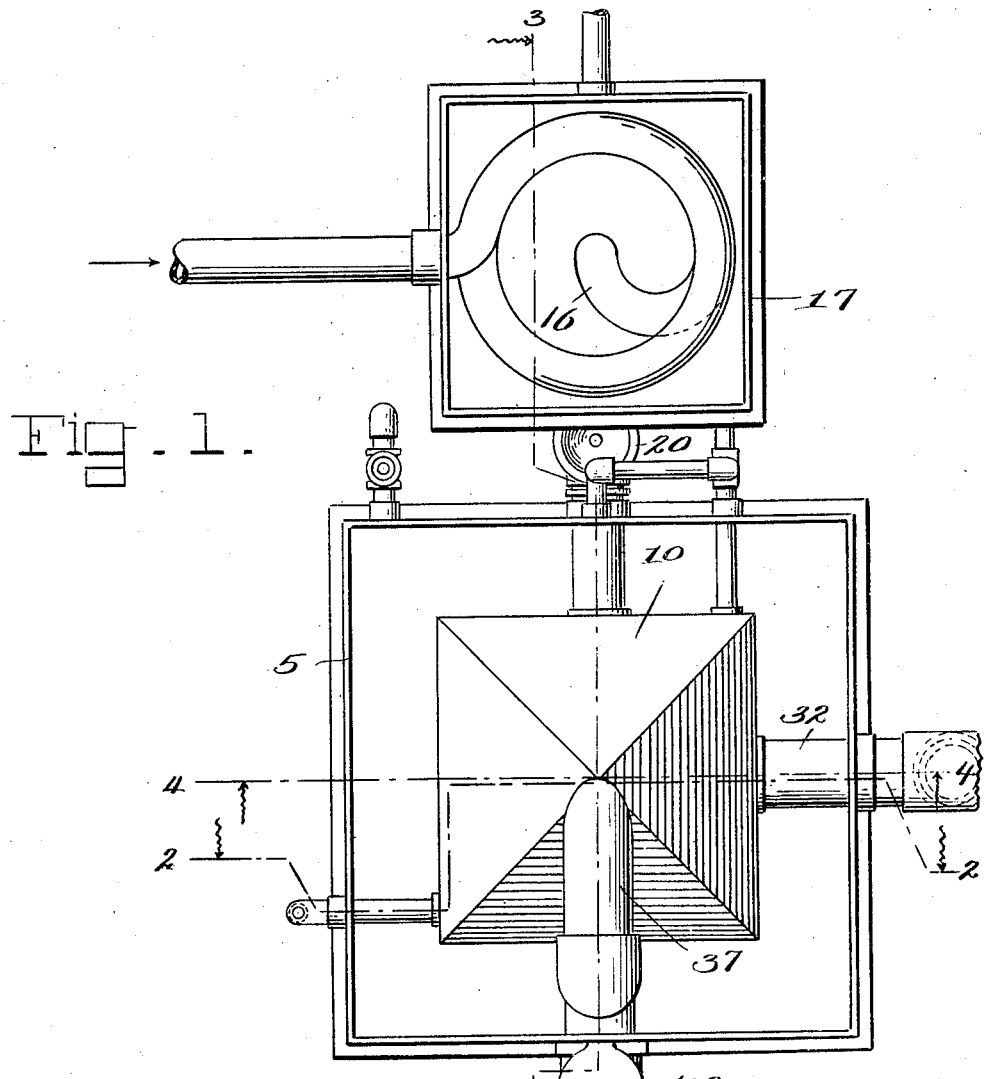
Figure 2:
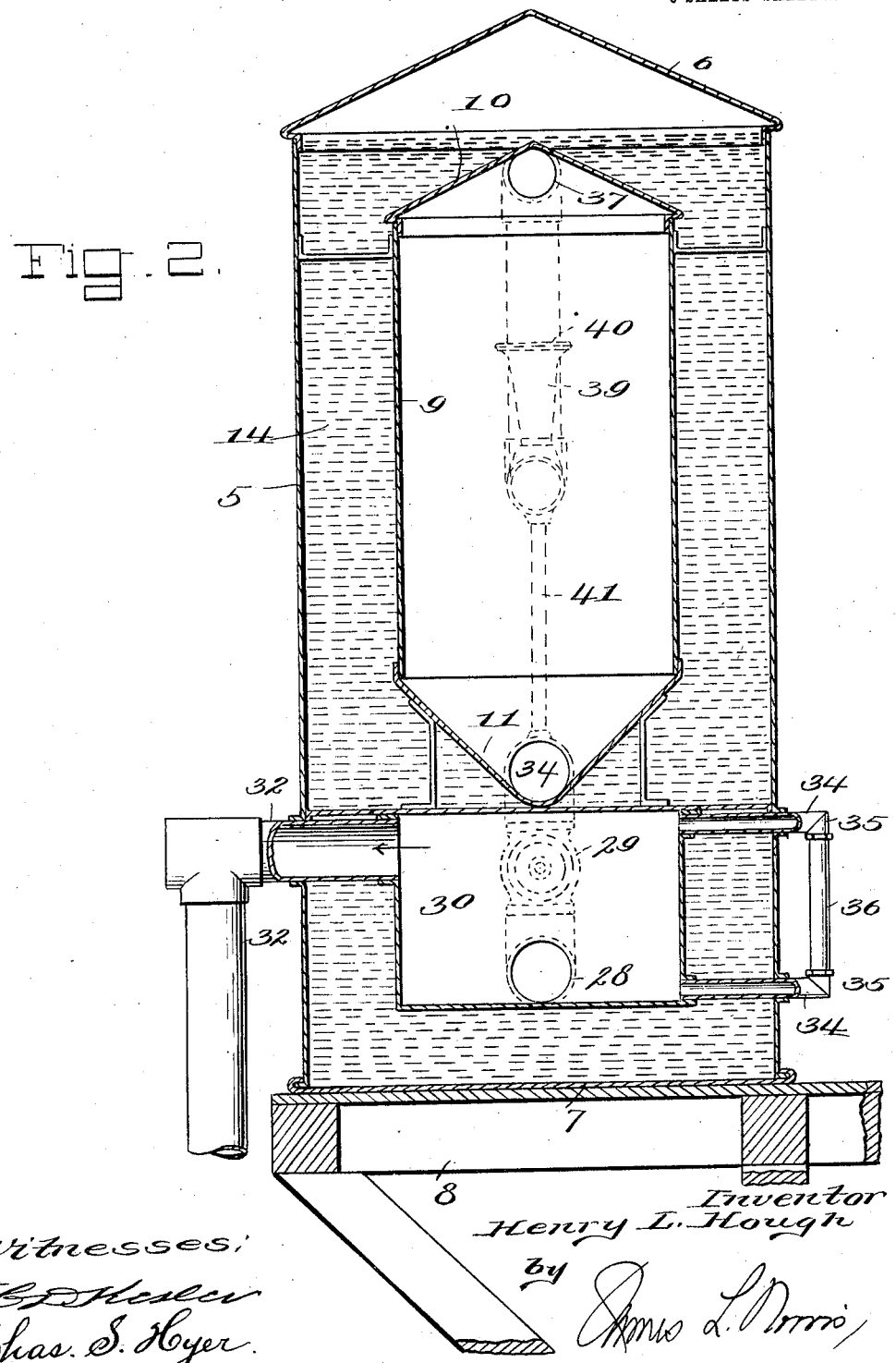
Figure 3:
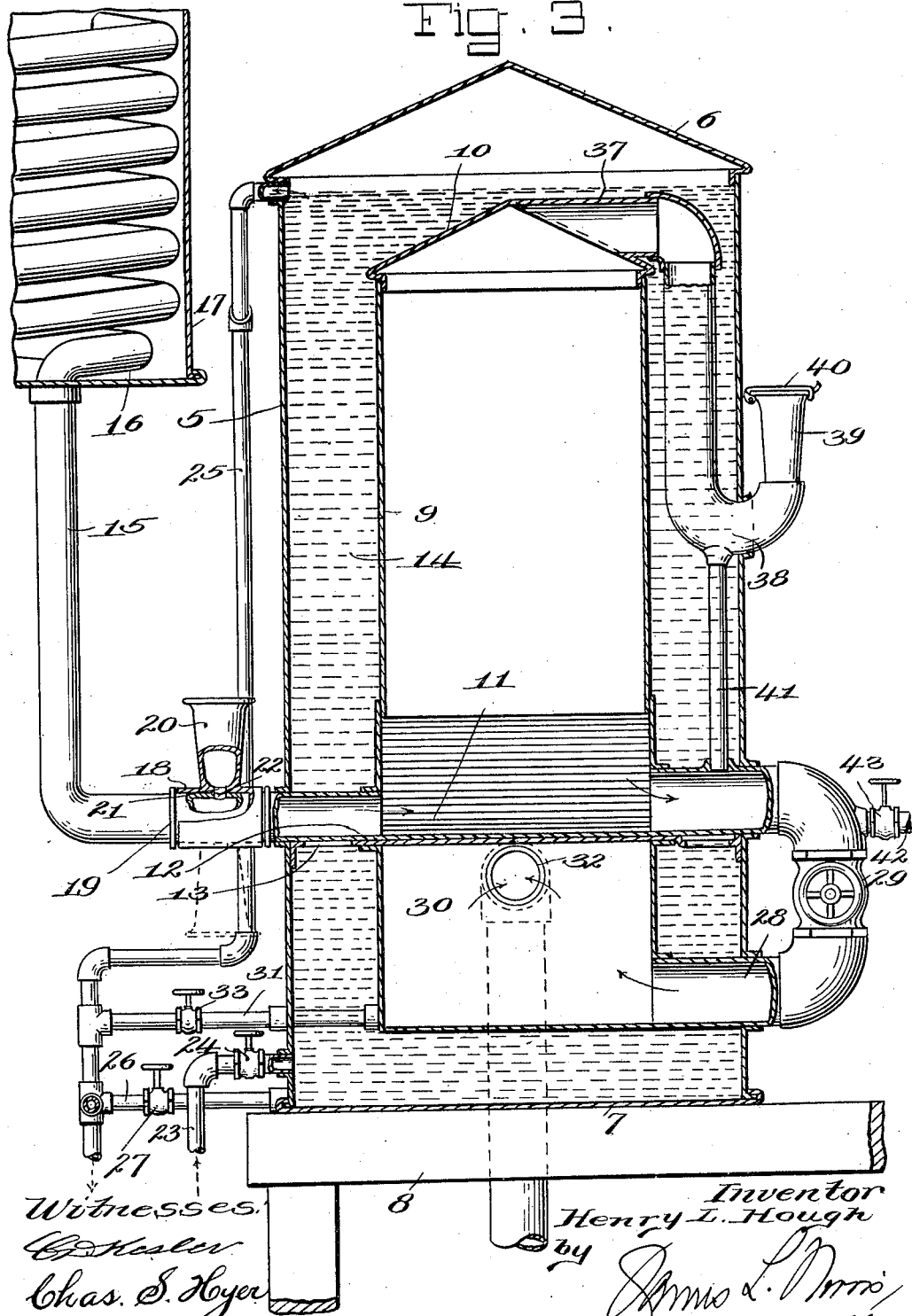
Figure 4:
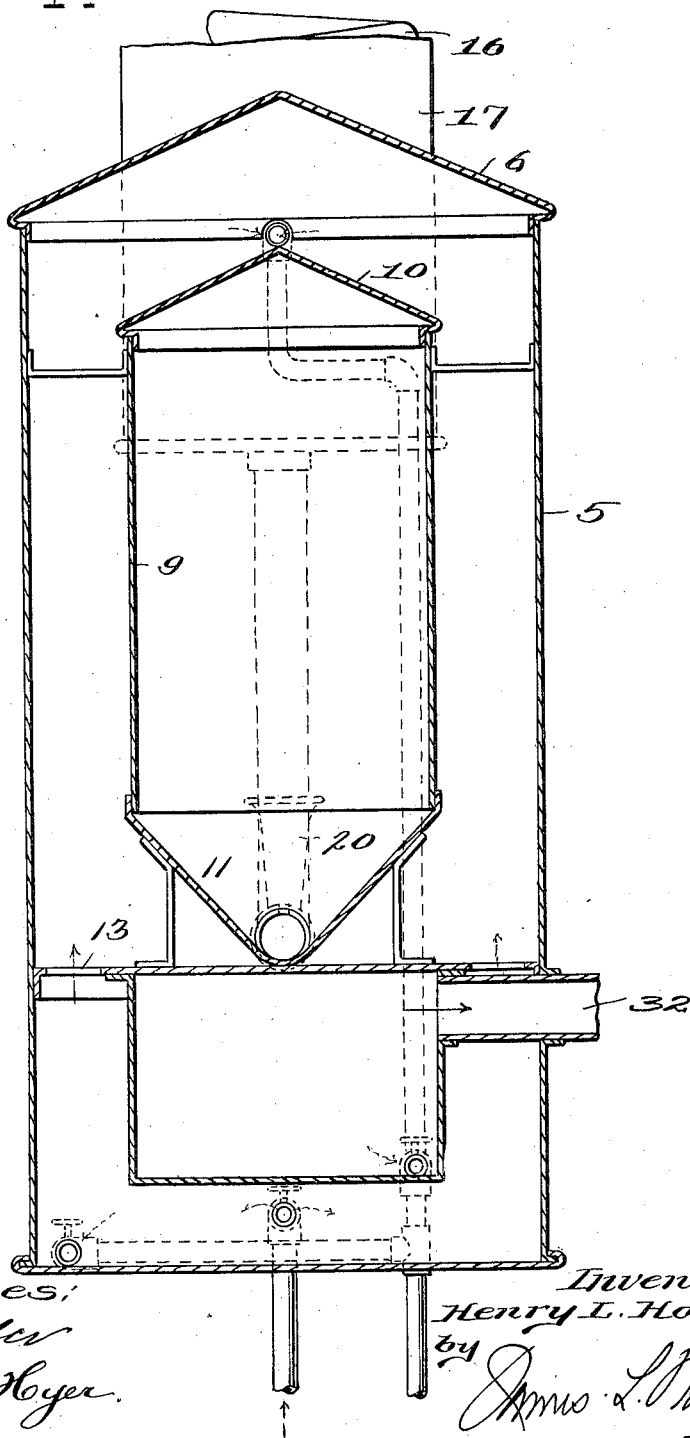
Figure 5:
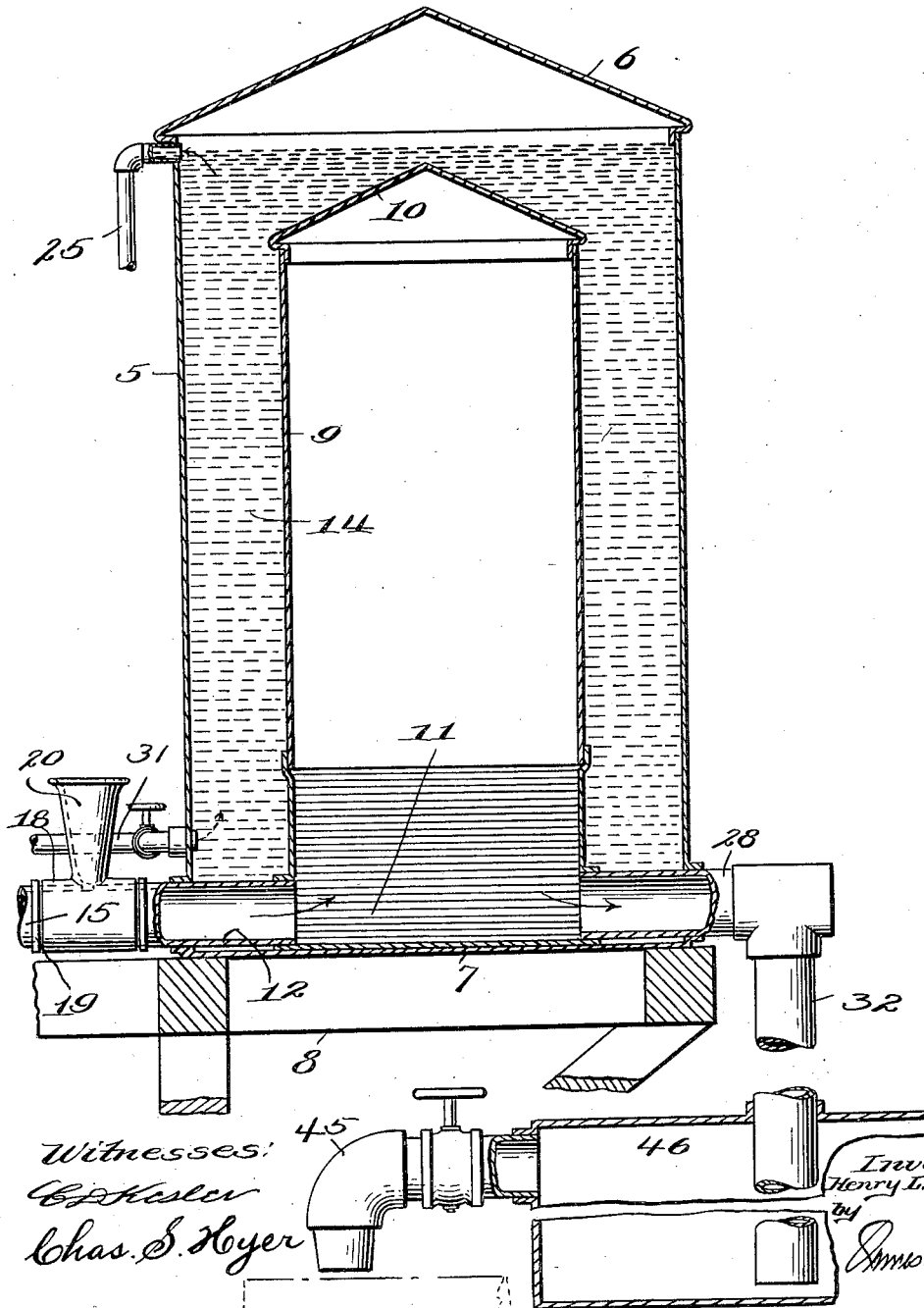

In the drawings: Figure 1 is a top plan view of the usual form of condenser coil or worm showing the improved apparatus associated therewith. Fig. 2 is a transverse vertical section taken in the plane of the line 2—2, Fig. 1 looking in the direction of the arrows. Fig. 3 is a longitudinal vertical section taken in the plane of the line 3—3, Fig. 1. Fig. 4 is a section taken in the plane of the line 4—4, Fig. 1 looking in the direction of the arrows and opposite to the section taken in the plane of the line 2—2. Fig. 5 is a transverse vertical section showing parts broken away and illustrating a modification in the construction.

The numeral 5 designates an upright tank of suitable dimensions having a peaked or other cap 6 and a closed bottom 7 adapted to be held on a suitable support 8. Centrally located within the tank 5 is a vapor expansion chamber 9 also having a dome-like top 10 and a closed hopper-shaped bottom 11, which as shown by Figs. 2, 3 and 4 is held on a horizontal partition plate or septum 12 provided with a plurality of openings 13 therethrough to permit the upward movement of the condensing or cooling liquid 14 in the said tank 5. A pipe 15 connects the usual worm or coil 16 of a still condenser 17 with the chamber 9, entering the lower portion of the hopper-shaped bottom 11 and having thereon a listener or auditory testing device consisting of a sleeve 18 loosely and rotatably held between collars 19 on the said pipe 15 and provided with an ear piece 20 having an opening 21 in the bottom thereof adapted to register with an opening 22 in the pipe 15 when the sleeve 18 is turned to upright position, as shown by full lines in Fig. 3. When the sleeve 18 is rotated to bring the ear piece 20 in a depending position as shown by dotted lines in Fig. 3, the opening 22 is closed and will so remain until a registration is set up between the openings 21 and 22. The object of this listener or auditory test attachment or device is to ascertain the condition of the operation of the apparatus by sound with which the practiced ear of the operator will soon become accustomed and reliably determine whether or not the operation is being successfully carried on. The tank 5 is supplied with the cooling or condensing liquid 14 through the medium of a pipe 23 connected to the lower portion thereof and provided with a valve 24, and attached to the upper portion of the tank is an overflow pipe 25 extending downwardly any distance away from the tank; and in some instances a drain pipe 26 provided with a valve 27 may also have communication with the overflow pipe 25 and also with the lowermost portion of the tank 5 so that the latter may be fully drained of its contents and cleaned out if desired directly into the pipe 25.

In the form of the device shown by Figs. 2, 3 and 4, a supplemental or collecting chamber 30 is disposed immediately under and held by the partition or septum 12, and connecting the extreme lower portion of the trough-like bottom 11 of the chamber 9 opposite the inlet of the pipe 15 to said chamber 9 and also the lower portion of the chamber 30 is a pipe 28 having a valve 29 whereby the contents of the trough-like bottom 11 of the chamber 9 may be permitted to run freely down to the lower portion of the chamber 30. The chamber 30 also has an outlet pipe 32 connected to the upper portion thereof for the overflow or decantation of the condensed turpentine vapors and turpentine passing into the said chamber 30, and to the bottom portion of the latter chamber opposite the point of communication therewith of the lower end of the pipe 28 a drain pipe 31 is attached and has a valve 33 therein, said drain pipe being connected to the pipe 25 and adapted to drain out the water from the chamber 30. The chamber 30 is also provided with a level attachment consisting of tubular arms 34 communicating with the upper and lower portions of the said chamber having elbow sockets 35 in which the upper and lower terminals of a glass or transparent tube 36 are mounted, this attachment giving an exterior indication as to the contents of the chamber 30, such as the amount of water and turpentine that may be collected therein. Attached to the dome 10 and communicating with the upper portion of the chamber 9 is an outflow pipe 37 for the escape of the uncondensed vapors that may not become fully condensed and also for the liberation of air that may be carried along with the vapors. The pipe 37 depends downwardly between the walls of the chamber 9 and tank 5 and terminates in an upturned crook or bend 38 projecting through the wall of the tank and carrying a fixed listener or auditory test device 39 provided with a hinged cap 40, the said auditory test device constantly standing vertically and serving as another means for the operator to readily ascertain and determine whether or not the apparatus is properly operating. Connected to the lower portion of the crook or bend 38 is a pipe 41 of smaller dimensions than the pipe 37 and depending between the walls of the chamber 9 and tank 5 to and communicating with the pipe 31, a test pipe 42 being attached to the upper elbow of the pipe 28 and provided with a valve 43, said pipe 42 having communication with the interior of the pipe 28 and adapted for use by the operator in determining the quantity of the condensed turpentine. In some structures embodying the features of the invention the auditory testing devices 20 and 39 may be omitted, and the operator may then ascertain through the pipe 42 the state of the interior operation.

The vapors that pass out through the pipe 37 and downwardly through the pipe 41 into the pipe 28 enter the chamber 30 and are again subjected to a cooling or condensing operation and the condensed turpentine or other products commingle with the turpentine and other products in the chamber 30 flowing from the trough-like bottom 11 of the chamber 9, and as the condensed turpentine in its product is of less specific gravity than water it will be gradually elevated on the water until it overflows or decants through the pipe 32 communicating with the upper portion of the chamber 30 and by which it is carried off to any suitable receptacle. By having the pipe 32 connected to the top of the chamber 30, as clearly shown by Fig. 2, condensation of the vapors passing into the chamber 30 is practically carried on some time before outlet of the condensed products ensues, and when the chamber is full to overflowing the turpentine and its byproducts will be permitted to freely pass out from the chamber. The level glass or gage 36, which is exterior of the apparatus, will positively inform the operator as to the height or level of the contents of the chamber 30. When the apparatus is operating the turpentine continually passes off through the pipe 32, the latter being of such size as to permit a ready and rapid flow off of the turpentine, and said pipe 32 may be of any suitable length to conduct the turpentine and byproducts away from the chamber 30 any suitable distance from the condenser or apparatus.

The form of the apparatus shown by Fig. 5 is in all respects similar to that just described except that the tank 5 is not as high as in the preceding figures and the dome 10 of the chamber 9 does not have the pipe 37 connecting therewith, and, further, the chamber 30 is placed exteriorly of the tank instead of interiorly, said chamber being indicated in Fig. 5 by the reference character 46 and having the pipe 28 extending directly downwardly thereinto, and from the upper portion of the chamber 46 the turpentine is drawn off through the medium of a valved cock into a barrel or other receptacle and stored or subjected to further treatment for separation of byproducts or delivered directly to the market in accordance with the character of the turpentine or the source from which it is taken. In the apparatus as shown by Fig. 5 the vapors coming from the worm or coil similar to that shown by Figs. 1 and 3 pass through the pipe 15 into the lower portion of the trough-like bottom 11 of the chamber 9, and after expanding in the chamber 9 and becoming condensed, the liquid flows out from the bottom 11 through the pipe 31 downwardly into the tank 46 through the pipe 28, or it may be drawn off through the cock or faucet 45 which is used in this form of the apparatus similarly to the preceding construction and as shown particularly by Fig. 2. It will be understood that the tank 5, as shown by Fig. 5, will be supplied with a refrigerating liquid and provided with an overflow in a manner similar to the construction shown by Fig. 3, but the pipes 33 and 41 together with the listener or auditory test device 39 are omitted and also the pipe 42 with its valve 43.

The improved condenser or auxiliary condensing attachment or apparatus will be found exceptionally advantageous in avoiding the necessity of subsequent operations in treating the turpentine after the condensed vapors pass through the ordinary coil or worm as in the usual distilling apparatus, and, furthermore, practically all of the turpentine and byproducts are conserved by the prevention of escape of vapors that may not be condensed in the usual form of coil or worm.

The various parts of the apparatus are tightly fitted to each other to prevent the escape of vapors and a consequent loss of turpentine, it being appreciated that the vapors can escape through a very slight opening. The pipes 15 and 28 are disposed on a level in the lower portion of the hopper shaped bottom 11 of the chamber 9 so as to permit the turpentine or condensed deposit in said bottom to pass without resistance and freely from the chamber to avoid interference with the sound the operator must get from the apparatus to ascertain whether or not the condition of the charge and the operation of the apparatus is regular. The cover 6 is loosely fitted in the tank 5 to permit air to escape around the joint thereof as the water or cooling medium fills the tank so that the pressure of the water or cooling medium will not collapse the inner chamber 9. Furthermore, the cover is loosely fitted in the tank 5 for the purpose of ready removal to permit cleaning out the space between the tank and chamber, such cleaning operation being necessary in view of the fact that there may be a deposit, as for instance from lime water as well as other water and in order to have the apparatus effectively operate, the space between the tank and chamber should be kept clean or free of this deposit. The cleaning operation is effected through the medium of a broom or other analogous device inserted between the walls of the chamber and tank to loosen the deposit or sediment and allow it to escape through the drainage means for the tank.

The intention of the improved condensing apparatus, as hereinbefore indicated, is to condense the vapor which has heretofore escaped unnoticed or unrecovered in the passage of all the vapors from the still through the ordinary coil or worm, and the escape of such vapors resulted in the loss of turpentine.

In referring to water in the preceding description it will be understood that such water results from condensation of the uncondensed vapors that pass from the worm into the retort or the chamber 9, the water of condensation naturally falling to the bottom of the chamber and being carried off therefrom. As well understood in the art of distillation, there are some vapors more difficult to condense than others, and in accordance with the applicant's invention the vapors which have failed to become condensed in passing through the worm enter the chamber 9 and said vapors always deposit more or less water when condensed.

What is claimed is:

1. In a turpentine condenser of the class specified, the combination of a tank for containing a condensing medium, a chamber within the tank having a hopper shaped bottom and an inlet and an outlet in opposed positions at the lowermost portions of said bottom for the turpentine and turpentine vapors to be treated, and a second chamber with which the first named chamber has communication for receiving the condensed turpentine and separating the latter from water.

2. In a turpentine condenser of the class specified, the combination of a tank for containing a condensing medium and provided with feed and drainage devices, a chamber within the tank having a hopper shaped bottom and an inlet and an outlet in opposed positions at the lowermost portions of said bottom for the material to be treated, a second chamber with which the outlet of the first chamber has communication, the second chamber receiving the condensed turpentine and operable to separate the latter from the water of condensation, and a worm or coil connected to the inlet pipe of the first named chamber.

3. In a turpentine condenser of the class specified, the combination of a tank for a condensing medium, a chamber within the tank provided with an inlet and outlet for the material to be treated, and a second chamber within the tank with which the outlet of the first chamber communicates and also provided with an outflow pipe for separating the turpentine in the second chamber from the water.

4. In a turpentine condenser of the class specified, a tank for containing a condensing medium and provided with supply and drainage devices, a horizontal partition in the tank, a chamber supported on the said partition and having inlet and outlet pipes, and a second chamber below the first named chamber and also held by the partition and having the outlet pipe of the first chamber connected thereto and also provided with an outflow pipe for separating the turpentine from the water in the said second chamber.

5. In a turpentine condenser of the class specified, a tank for containing a condensing medium, a chamber mounted in the tank and having a trough-like bottom and also provided with an inlet pipe above said bottom and an outlet pipe at the lower portion of said bottom, and a second chamber mounted in the tank and having the outlet pipe of the first chamber connected thereto and also provided with means for separating the turpentine from the water of condensation by decantation.

6. In a turpentine condenser of the class specified, the combination of a tank for receiving a condensing medium, a condensing chamber within the tank having an inlet and an outlet pipe, the inlet pipe being provided with an opening therein, a sleeve rotatably mounted on the pipe over said opening and also provided with an opening therethrough and having an ear piece over the opening, the sleeve being rotatable on the pipe, and a worm to which the inlet pipe is connected.

7. In a turpentine condenser of the class specified, the combination of a tank for containing the condensing medium, a chamber in the tank having an inlet and an outlet pipe at the lower portion thereof for receiving and liberating the matter treated, a pipe being connected to the upper part of said chamber and having a pipe connection with the outlet of the chamber, and a second chamber within the tank with which the outlet pipe of the first chamber communicates and also provided with an outlet pipe at the upper portion thereof.

8. In a turpentine condenser of the class specified, the combination of a tank for receiving a condensing medium, a chamber within the tank having an outlet pipe and an inlet pipe at its lower portion, the chamber also having an outlet pipe at its top portion continuing into a terminal upwardly projecting crook at its lower extremity, an auditory test device connected to the terminal of the said crook, a second chamber within the tank with which the outlet pipe of the first chamber has communication and also provided with an upper outlet, and a pipe between the said crook and the lower outlet pipe of the first named chamber.

In testimony whereof I have hereunto set my hand in presence of two subscribing witnesses.

HENRY L. HOUGH.

Witnesses:
D. W. BEATY,
JOHN WATERS.

---

Copies of this patent may be obtained for five cents each, by addressing the "Commissioner of Patents, Washington, D. C."